(12) United States Patent
Carroll

(10) Patent No.: US 6,229,225 B1
(45) Date of Patent: *May 8, 2001

(54) SURFACE WAVE ENERGY CAPTURE SYSTEM

(75) Inventor: Charles B. Carroll, Trenton, NJ (US)

(73) Assignee: Ocean Power Technologies, Inc., Pennington, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,619

(22) Filed: May 5, 1998

Related U.S. Application Data

(60) Provisional application No. 60/045,955, filed on May 8, 1997.

(51) Int. Cl.[7] .............................. F03B 13/10; F03B 13/12
(52) U.S. Cl. .............................. 290/53; 290/42; 290/43; 290/54
(58) Field of Search .................................. 290/42, 43, 53, 290/54

(56) References Cited

U.S. PATENT DOCUMENTS

| | | | |
|---|---|---|---|
| 4,152,895 | * | 5/1979 | Wirt ........................................ 60/398 |
| 4,327,296 | * | 4/1982 | Weyers .................................. 290/53 |
| 4,383,182 | * | 5/1983 | Bowley .................................. 290/43 |
| 4,398,095 | * | 8/1983 | Ono ........................................ 290/53 |
| 4,622,473 | * | 11/1986 | Curry .................................... 290/53 |
| 4,631,921 | * | 12/1986 | Linderfelt ............................ 60/501 |
| 4,748,808 | * | 6/1988 | Hill ...................................... 60/398 |
| 4,850,190 | * | 7/1989 | Pitts .................................... 60/398 |
| 5,324,988 | * | 6/1994 | Newman .............................. 290/54 |
| 5,798,572 | * | 8/1998 | Lehoczky ............................ 290/54 |

* cited by examiner

*Primary Examiner*—Elvin Enad
(74) *Attorney, Agent, or Firm*—Michael Y. Epstein; Henry I. Schanzer

(57) ABSTRACT

For capturing energy contained in surface waves on a body of water while protecting the system from damage against conditions on the water surface, a transducer for converting wave energy to useful, e.g., electrical, energy is anchored to the water bed. A float is connected to the transducer by a rigid connector for transmitting variable forces against the float caused by wave induced circulatory water movements against the float. The connector is of such length that the float is always fully submerged (but within the energy zone of the waves) thus displacing a fixed volume of water and providing an essentially constant upward force on the transducer. The constant upward force is modified by the moving water induced variable forces against the float. The float can be a sphere, but the float is preferably of a shape including laterally extending panels providing a ratio of area to volume larger than that provided by a sphere. The transducer can be suspended from the float either closely adjacent to or well above the floor of the water body.

3 Claims, 2 Drawing Sheets

SURFACE WAVE ENERGY CAPTURE SYSTEM

This invention claims the benefit of U.S. Provisional Application No. 60/045,955, filed May 8, 1997.

BACKGROUND OF THE INVENTION

This invention relates to the capture of energy from waves on the surface of a body of water and, particularly, to a power generating system using a sub-surface energy capturing element.

Various systems are now known for capturing energy from waves passing along the surface of a body of water, particularly an ocean where quite large and powerful waves are consistently present. Typically, such systems comprise a float or buoy which floats directly on the water surface and which rises and falls with the passing waves. The float thus experiences an upward force with a rising wave, and the weight of the float can exert a downward force with a falling wave. The float associated forces are used in various arrangements for mechanically driving a transducer for converting the mechanical forces and associated mechanical energy to useful forms of energy, e.g., electrical power.

While the floats typically remain on the water surface, for maximum energy capture from the passing waves, it is known (as discussed in U.S. Pat. No. 5,578,889 to Epstein) to deliberately completely submerge the float during storm conditions for protecting the float from damage by extremely rough and violent surface conditions. In recognition of the fact that water pressure variations, and attendant circulatory water flows, are present within the water at depths lower than the wave troughs, the patent discloses submerging the float deep enough for protection against wave violence, but not so deep as to be outside the wave energy zone. Thus, energy is generated, but at reduced levels, even when the float is removed from its normal position on the water surface. Submerging the float from its normal surface position thus requires, in the patent arrangement, means for changing the normal buoyancy of the float from its usual non-storm operating conditions. The provision of such buoyancy changing means tends to be rather complex and, for practical reasons, can be used only with quite large and expensive power generating systems.

In smaller systems, particularly for the generation of relatively small amounts of power, e.g., for trickle charging a storage battery, provision of such buoyancy changing means is quite impractical.

SUMMARY OF THE INVENTION

A system for converting mechanical energy from water body surface waves comprises a mechanical energy transducer and a wave energy capturing element secured to the transducer for transmitting mechanical energy to the transducer for conversion into useful, e.g., electrical, energy. The energy capturing element comprises a float so positioned, relative to waves of a preselected maximum amplitude, to be always fully submerged beneath the waves, but within the energy zone of the waves for causing movements of the float. Being always fully submerged, the float provides an essentially constant upward force bias on the transducer, and a varying force, superimposed on the bias force, in response to movements of the float caused by wave induced circulatory motions of the subsurface water. In known fashion, the energy associated with the moving float is used by the transducer for generating useful power.

DESCRIPTION OF PREFERRED EMBODIMENTS

Figure 1:
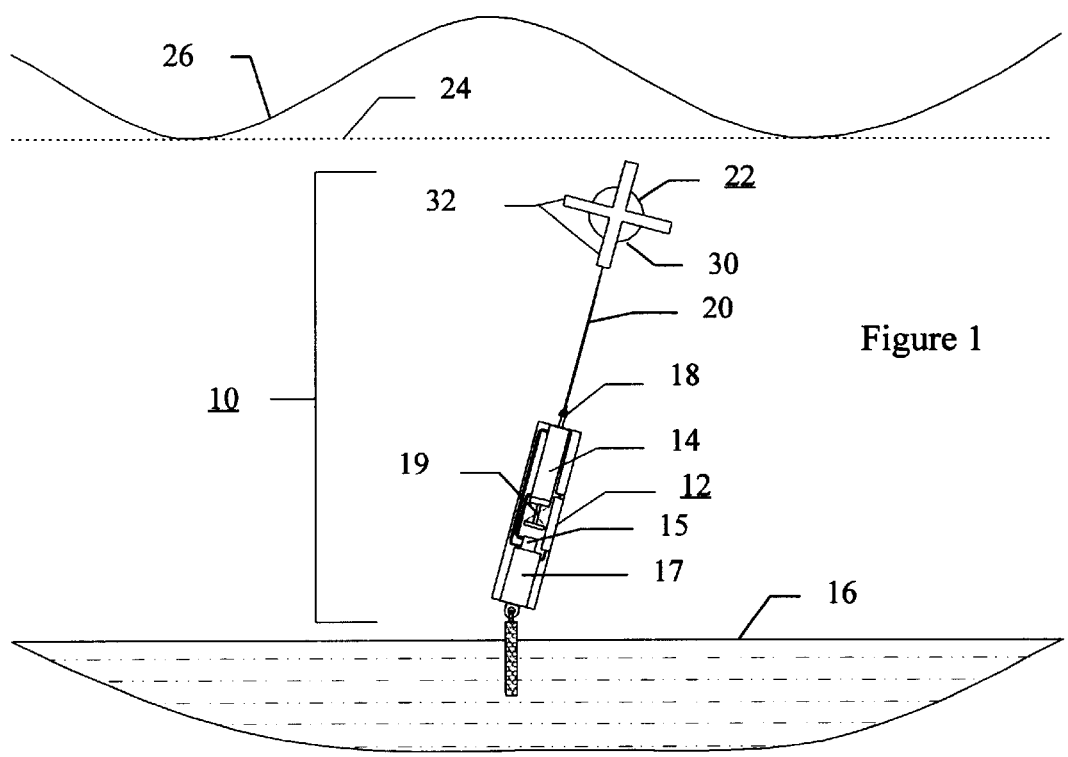
FIG. 1 is a schematic view showing the deployment of a system according to the invention within a shallow body of water.

One power generating system 10 according to the invention, for use in relatively shallow water, is shown in FIG. 1. The system includes a known type of mechanical energy transducer 12 for converting variable linear forces and displacements to useful power. By way of example, the transducer can include a hydraulic cylinder 14 suitable for pumping hydraulic fluid for turning a hydraulic motor 15 driving an electrical generator 17. The transducer 12 is firmly anchored in fixed vertical position relative to the floor 16 of the body of water in which the system is disposed.

The piston 18 of the hydraulic cylinder 12 is connected by a cable 20 to a float 22 having a positive buoyancy for exerting an upward force on the piston 18. The length of the cable 20 is selected to maintain the float 22 fully submerged beneath the water surface for waves of a preselected amplitude (as discussed hereinafter). A return spring 19 serves to elastically resist upward movement of the piston 18 and to retract the piston into the cylinder when the upward force on the cable 20 is relaxed as the float falls downwardly from a wave peak.

In the absence of any waves or variable currents tending to move the float 22, the float remains stationary beneath the water surface and the constant upward force on the cylinder piston 18 provided by the buoyant float results in no movement of the piston 18 and no generation of power. The return spring 19 is selected to approximately balance the constant upward force from the float 22 at the midpoint of allowable spring compression.

Even with the presence of passing surface waves 26, as shown in FIG. 1, the float remains always fully submerged (the dash line 24 indicating the maximum depth of the wave troughs) and the upward force on the float caused by the weight of the water displaced by the float remains essentially constant. (This is in contrast to what occurs with a float on the water surface where, as a rising wave approaches the float, the water tends to rise around the float. This increases the volume of water displaced by the float thus increasing the upward force on the float for raising it.)

Figure 2:
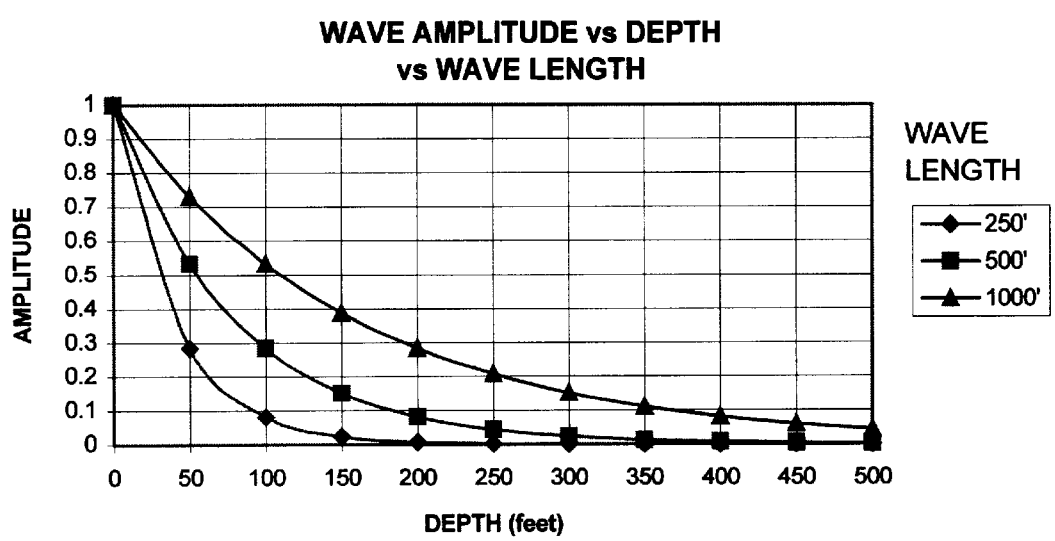
FIG. 2 is a graph showing the variation of effective wave amplitude of surface waves with depth beneath the surface for waves of three different wavelengths.

Although the displaced water volume of the float thus does not change, the system is so designed that the float, while fully submerged, remains within the "energy zone" of the waves. By "energy zone" is meant that submerged volume beneath the water surface where energy carried by the wave can be "felt" and extracted. FIG. 2 shows the relationship between the effective wave amplitude and depth for waves of three different wave lengths, where depth below the mean water surface is plotted along the X axis, and effective wave amplitude (Ed) is plotted along the Y axis. These curves are developed from the following equation:

$$E_d = E_s exp(-2\pi d/\lambda)$$

where:
  $E_s$ is the energy due to a wave at the water surface, and
  $E_d$ is the energy due to a wave at the depth d, and
  $\lambda$ is the wave length of the waves being considered.

The wave length of water waves can be calculated by the formula:

$$\lambda = gT^2/2\pi$$

where:
  g is the gravitational constant, 9.8 meters per second per second, and
  T is the period of the waves in seconds.

For example, at a 50 foot depth, waves with a wave length of 500 feet have an effective amplitude of approximately 53% of the wave amplitude at the water surface. Because the power contained within a wave is proportional to the square of the amplitude of the wave, about 28% of the surface wave power is available for capture at the 50 foot depth.

The longer the wavelength, the more slowly does the magnitude of available energy decrease with depth.

Returning to the aforementioned example of 500 feet wavelength waves, typical ocean waves of this wavelength have a period of 5 seconds and an amplitude of around 2 to 4 feet. Thus, disposing the float 22 at a depth of 50 feet disposes the float completely submerged during the passing of the 500 foot wavelength waves.

As known, during passage of a surface wave, the wave energy is transmitted through the water which is essentially stationary with respect to the direction of wave travel. Water beneath the wave, however, tends to move in circular or elliptical paths, and it is this "local" movement of the water which is relied upon for causing corresponding circulatory movements of the float 22. Accordingly, to the extent that the float 22 can capture the energy in the surrounding "locally" circulating water and move in circular paths with the water, cyclically varying forces are transmitted along the cable 20 to the anchored transducer 12. Such variable forces cause a pumping action of the cylinder piston, hence produce variable hydraulic pressures and flows for driving the electrical generator for generating electrical energy.

As mentioned, the float remains fully submerged during operation of the system, and with a float of constant mass and volume, the upward force applied to the transducer owing to the buoyancy of the float remains constant. The amount of energy captured by the float is determined primarily by the area and shape of the float and only secondarily by the float mass. Accordingly, the amount of energy to be captured can be varied substantially independently of the constant force applied by the float. This provides flexibility both in the design and operation of the system.

For example, for a given transducer having a preferred range of driving power, the buoyancy of the float can be selected for providing the proper constant force to maintain the system at its proper depth, while the area and shape of the float can be independently selected depending upon how the system is to be deployed and the amount of wave power to be collected. Thus, if the system is intended for use with relatively small amplitude waves, the float would have a larger area to collect a given amount of power than if the system were deployed for use with larger amplitude waves. Also, because it is possible to readily change the area or shape of the float while little affecting its buoyancy (e.g., by varying the lengths of extension of thin panels mounted on the float), it is possible to vary the energy capturing capacity of the float for various wave conditions.

While, in FIG. 1, the transducer 12 is firmly anchored to the water body floor 16, the transducer is free to tilt, as illustrated. Thus, the float can capture energy from variable horizontal water flow as well as from passing waves.

The shape of the float can be varied and, for example, the float can be a simple sphere. In general, however, the ratio of the area to the volume of a sphere is not optimum for use in the inventive systems, and somewhat more complex shapes that hydrodynamically interact with the water motion are preferred. In the embodiment shown in FIG. 1, for example, the float comprises a central sphere 30 with laterally extending panels 32 for increasing the area to volume ratio of the float.

For added convenience, the float can be made of a flexible material or can be folded at hinge points for small size for storage and shipping. On site, the float is unfolded to expand it to desired shape and size. If additional mass is necessary for optimum performance, cavities in the float can be allowed to fill with water on deployment.

As mentioned, the circulatory movements of the submerged float 22 transmit variable forces to the transducer along the cable 20. Preferably, for avoiding absorption of the energy being transferred by stretching of the cable, the cable is highly inelastic. A suitable cable is made of steel or KEVLAR fibers.

Figure 3:
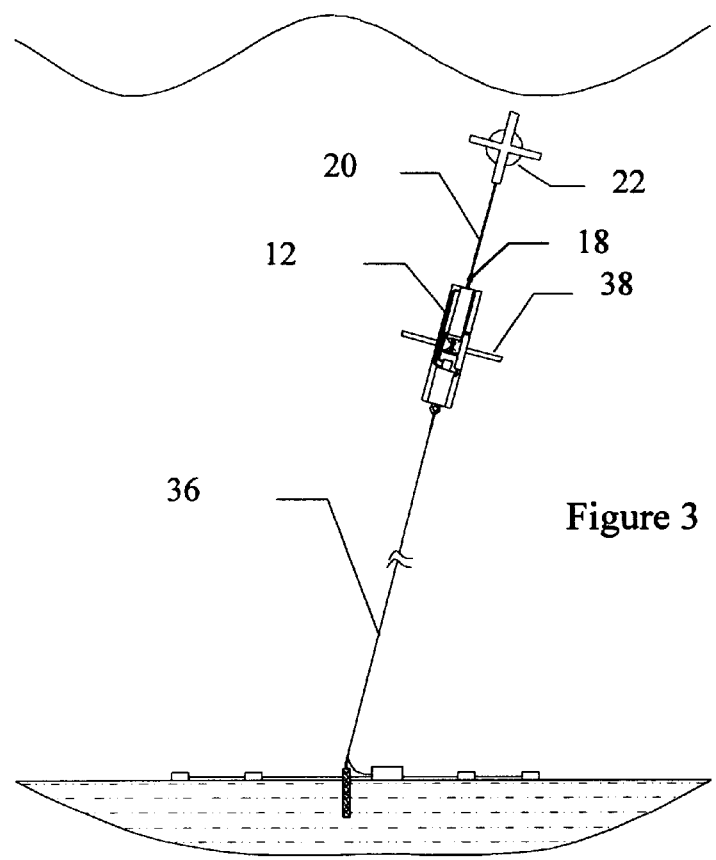
FIG. 3 is similar to FIG. 1 but showing deployment of a system, according to the invention, within a deep body of water.

FIG. 3 shows a modification of the system shown in FIG. 1 for use in deep water. In this embodiment, the transducer 12 is anchored to the water bed by an anchored, first cable 36, and the piston 16 of the transducer is connected to the float by a second, relatively short and inelastic cable 20. By this arrangement, the variable forces provided by the float 22 are effectively transferred to the transducer 12 rather than being possibly absorbed in the stretching of a quite long cable extending between the float and a transducer otherwise anchored to the water bed as in FIG. 1.

FIG. 3 shows the transducer 12 fitted with extending panels 38 serving for damping movements of the transducer. The transducer is located at a greater depth than the float and is therefore located in a lower wave energy zone. For example, if the transducer is located at a depth equal to one half of a given wavelength, the effective wave amplitude is approximately 4% of the amplitude at the surface. Thus, the motion-damping panel 38 on the transducer does not cause movements of the transducer in correspondence with movements of the float, but rather provides resistance to transducer movements. The transducer panels thus function as an in-line "anchor" for separating the float's force and motion from the long, somewhat elastic mooring line that connects to the bottom mounted anchor. This allows the transducer to adsorb the power rather than the power being wasted by stretching the elastic mooring line.

As previously noted, the design and deployment of the system preferably take into account the wavelengths of the waves expected at the deployment site. An advantage of the inventive systems is that by deliberately deploying the float relatively deeply submerged with respect to those waves with which the system is intended to interact, damage to the system can be avoided even with violent storm driven waves.

The greater the fixed depth of the float, the greater the degree of protection against storm conditions as well as against collisions by passing surface vessels. The greater the fixed depth, however, the smaller is the amount of wave energy available for capture. However, and particularly in situations where capital cost is relatively unimportant in comparison with the desired function (e.g., in data gathering systems deployed in mid-ocean), the necessary power can be obtained by adequately large energy capturing floats.

A further advantage of the inventive system is its suitability for use in situations where concealment of the system is desirable. Such concealment is accomplished largely by the submerged mode of operation. Additionally, the float and cables can be made from, and the transducer covered with, materials, e.g., known polymers, that are difficult to detect by sonar.

Figure 4:
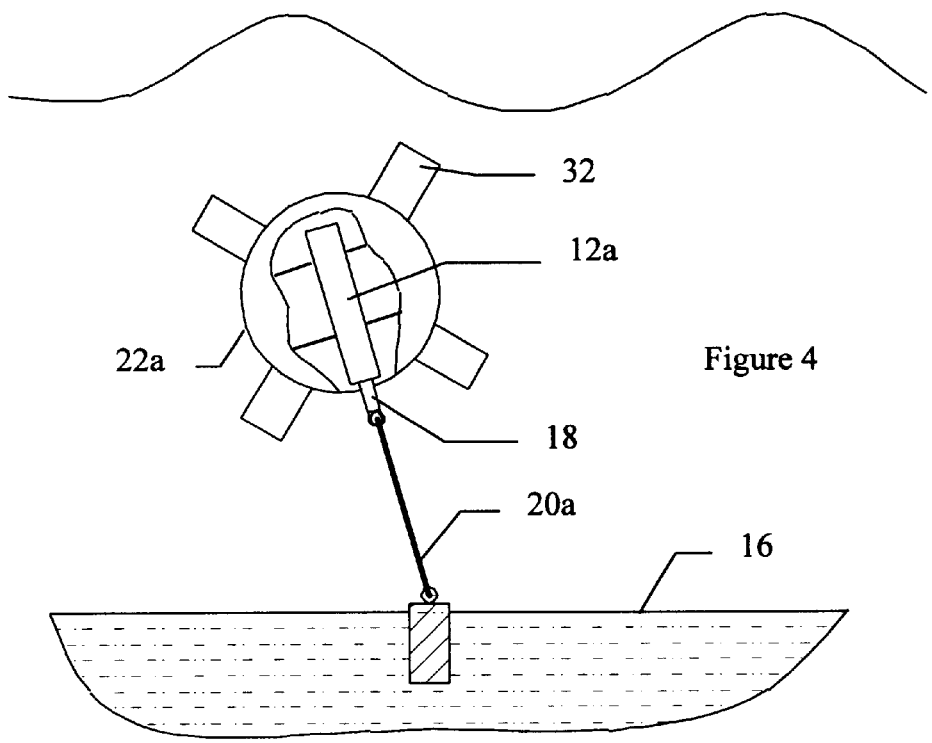
FIG. 4 is a schematic view showing a further embodiment of the invention.

Indeed, for better concealment (and better protection in any event), a transducer $12a$, in another embodiment of the invention shown in FIG. 4, is rigidly and hermetically mounted within a float $22a$ with a piston 18 of a hydraulic cylinder (not illustrated) extending, in movable, sealed relation with the wall of a float, downwardly from the float. Anchoring of the system, with the float always fully submerged, as in the FIG. 1 arrangement, is by means of an anchored cable $20a$.

What is claimed is:

1. A method of capturing mechanical energy from surface waves of preselected dimensions on a body of water, said waves having wave troughs of preselected maximum depths and causing water circulating movements beneath the wave troughs where the energy available for capture from the circulating water varies with water depth as follows:

$$E_d = E_s exp(-2\pi d/\lambda),$$

where:

$E_s$ is the energy due to a wave at the water surface; $E_d$ is the energy due to a wave at the depth d; and $\lambda$ is the wave length of the waves being considered;

the method comprising the steps of disposing an energy capturing apparatus including a float and all portions of the apparatus completely submerged within a body of water and with said float at a depth greater than said maximum depths for causing vertical circular oscillating movements of the float in response to passing surface waves while the float remains submerged, and rigidly connecting said float to a submerged energy converting transducer for transferring variable vertically directed forces for driving the transducer into mechanical energy converting operation.

2. A method according to claim 1 comprising rigidly disposing said transducer within said float with a portion of said transducer vertically movable with respect to said float and with said float being anchored to said water body floor.

3. A method according to claim 1 wherein the step of rigidly connecting the float comprises connecting the float to the transducer solely by a cable allowing lateral movements of the float relative to the transducer.

* * * * *